Aug. 4, 1970  G. G. NICLAS  3,522,631
APPARATUS FOR THE AUTOMATIC DOSING AND FILLING OF FLUENT
MEDIA INTO CONTAINERS OR THE LIKE
Filed Sept. 16, 1966  3 Sheets-Sheet 1
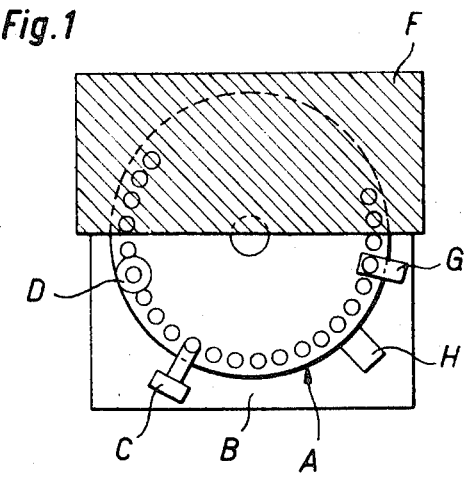
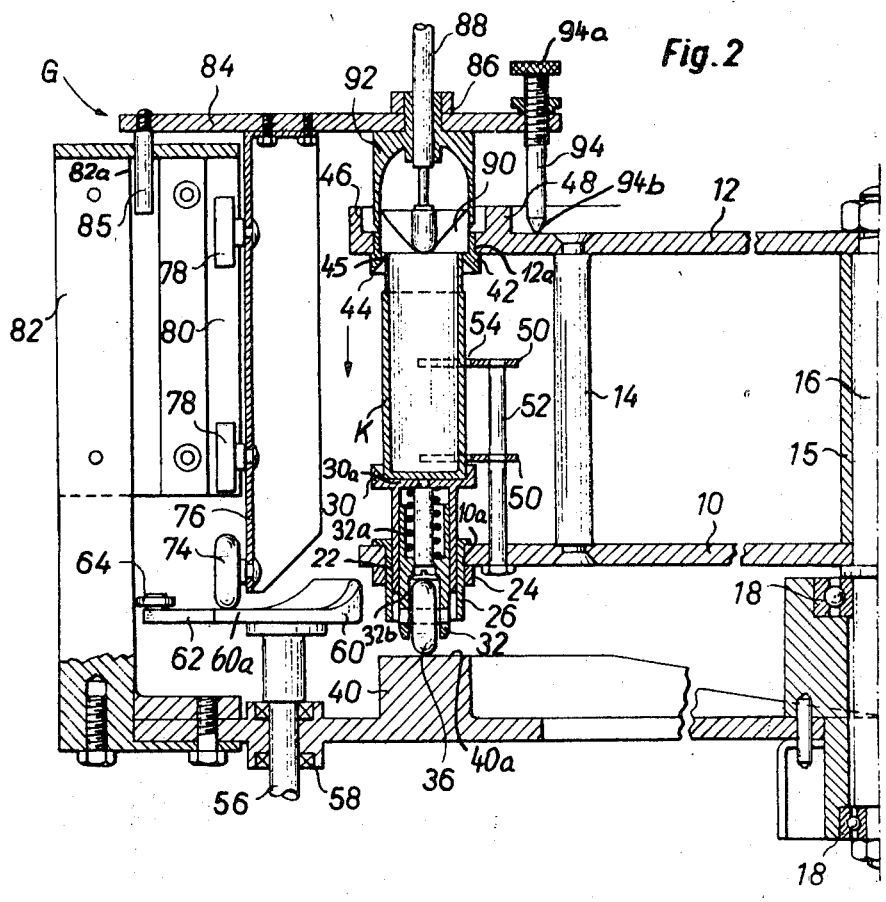

United States Patent Office 3,522,631
Patented Aug. 4, 1970

3,522,631
APPARATUS FOR THE AUTOMATIC DOSING AND FILLING OF FLUENT MEDIA INTO CONTAINERS OR THE LIKE
Giulio Giuseppe Niclas, Milan, Italy, assignor to Nico S.R.L., Milan, Italy, an Italian firm
Filed Sept. 16, 1966, Ser. No. 579,910
Claims priority, application Italy, Sept. 18, 1965, 20,882/65
Int. Cl. B29c 6/02; B65b 63/08
U.S. Cl. 18—20
15 Claims

ABSTRACT OF THE DISCLOSURE

Automatically dosing and filling of fluent materials capable of solidifying at ambient temperatures is disclosed. The novel apparatus comprises a rotatable table means provided with recesses for the reception of containers which are to be filled. Means defining an overflow recess are provided above each container-receiving recess of the table means. Disposed along the periphery of the rotatable table means in the direction of table rotation are infeed station means for loading the container-receiving recesses of the rotatable table means with empty containers, dosing means for introducing a dosed quantity of fluent material into the mouth of the containers, the dosed quantity exceeding the capacity of the containers, cooling means for cooling and solidifying the fluent material in the containers, stripper means for removing the excess quantity of material from the mouth of the containers, and removing means for removing the containers from the rotatable table means. By virtue of the novel apparatus, an improved filling of the containers is provided and specifically, by virtue of the dosing means delivering an amount of material to each container exceeding the capacity of the container itself, the formation of air bubbles in the filled container is effectively eliminated.

The present invention has reference to an improved apparatus for the automatic dosing and filling of fluent material or media into containers or the like.

The manufacture and preparation of different medical or cosmetic preparations, such as lipsticks, deodorant sticks or also suppositories requires that the previously molten substance is filled into a container or a mold wherein the previous flowable or fluent material hardens. The filling of the containers or the molds must proceed quite rapidly and the quantity to be filled must be measured out exactly in order that such containers or molds do not become soiled, so that the subsequent packaging can take place without further treatment or processing, by virtue of which the product could become spoiled.

Now, a primary object of the present invention relates to the provision of improved apparatus which renders possible an automatic dosing and filling of containers and, if desired, enables undertaking additional measures.

Another, more specific object of the present invention has reference to an improved apparatus for the filling of containers in such a manner that there is prevented the formation of air bubbles which could react harmfully with the substance or material which has been filled into the containers.

Still a further significant object of the present invention has reference to an improved apparatus for the reliable and efficient filling of containers with a fluent material in a hygienic and efficient manner, wherein the apparatus structure is relatively simple in construction yet extremely efficient and dependable in operation, not readily subject to malfunction and requires a minimum of servicing.

In order to implement these and still further objects of the invention which become more readily apparent as the description proceeds, the inventive apparatus is manifested by the features of a rotatable table means or turret which is provided at its periphery with recesses for the receipt of containers or the like which are to be filled. This rotatable table means or turret cooperates with means insuring for a stepwise indexing or drive of such rotatable table means. Additionally, there is provided a dosing mechanism incorporating at least one nozzle for the introduction of the dosed medium into the containers, and that shut-off means are arranged at said dosing mechanism which are actuated by virtue of the revolving motion of said rotatable table means. According to the invention, means are also provided for the removal of the filled containers from the rotatable table means and for delivering such containers for further processing.

According to one aspect of the invention the rotatable table means or turret can comprise two individual plate members arranged at a predetermined spacing from one another. Moreover, the lower plate member is equipped with vertically displaceable cup members for the receipt and support of the containers or the like which are to be filled, whereas the upper plate member is provided with guide openings for receiving the mouth portion of the containers retained by the aforesaid cup members.

However, the rotatable table means can also be provided with recesses at the guide openings for receiving the mouth portions of the containers. These recesses communicate with the containers which are to be filled and the openings of which align with the filling or infeed nozzle of the dosing mechanism in order to be able to deliver a remaining quantity of fluent material which exceeds the volumetric capacity of the container. This permits forming a fluid or liquid reserve above such container which prevents the formation of bubbles during hardening of the material. In so doing, means can be provided which enable stripping of the excess remaining material after the hardening process.

The invention will be better understood, and objects other than those set forth above, will become apparent, when consideration is given to the following detailed description thereof. Such description makes reference to the annexed drawings wherein:

FIG. 1 is a schematic plan view of a preferred embodiment of inventive apparatus;

FIGS. 2 and 3 depict on an enlarged scale, in fragmentary cross-sectional view, two angular positions of the rotatable table means or turret of the inventive apparatus;

Describing now the drawings and, in particular, initially directing attention to the overall arrangement of inventive apparatus depicted schematically in FIG. 1, it will be seen that such comprises a rotatable table means or turret A which is mounted for rotation about a substantially vertical axis at a frame unit B. The drive of the rotatable table means or turret A takes place in stepwise fashion, as such will be further explained more fully hereinafter. Due to this stepwise movement or indexing of the rotatable table means A the latter is caused to pass through different working stations. More specifically, one such station is the filling or infeed station C which serves for loading the rotatable table means A with empty containers K (FIG. 2) or the like. Furthermore, after the container charging or infeed station C there is provided a filling station D, a cooling station F, a stripping and finishing station G and a discharge or ejection station H.

Figure 3:
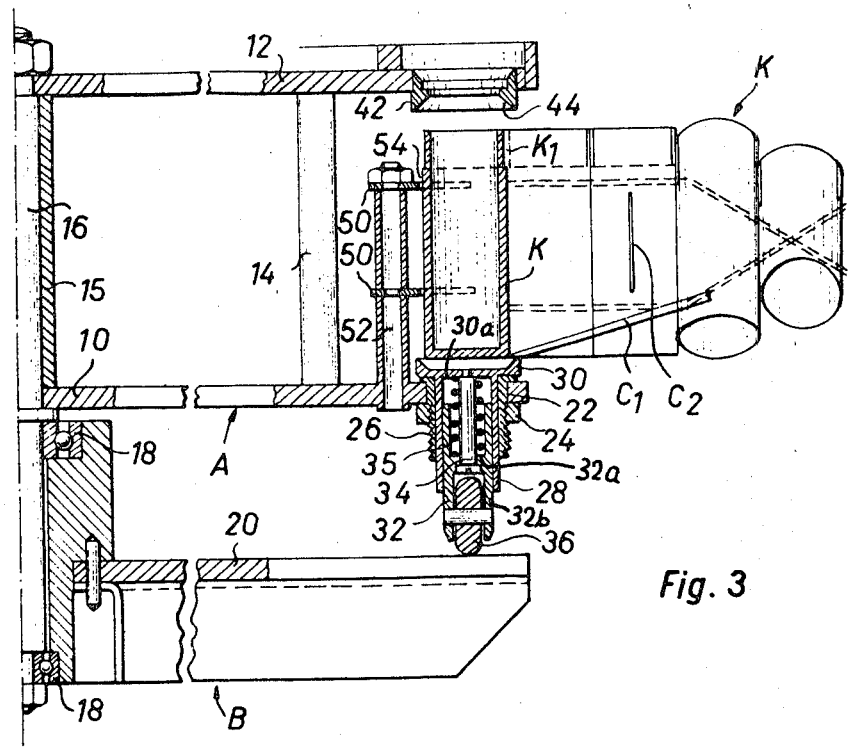
Figure 4:
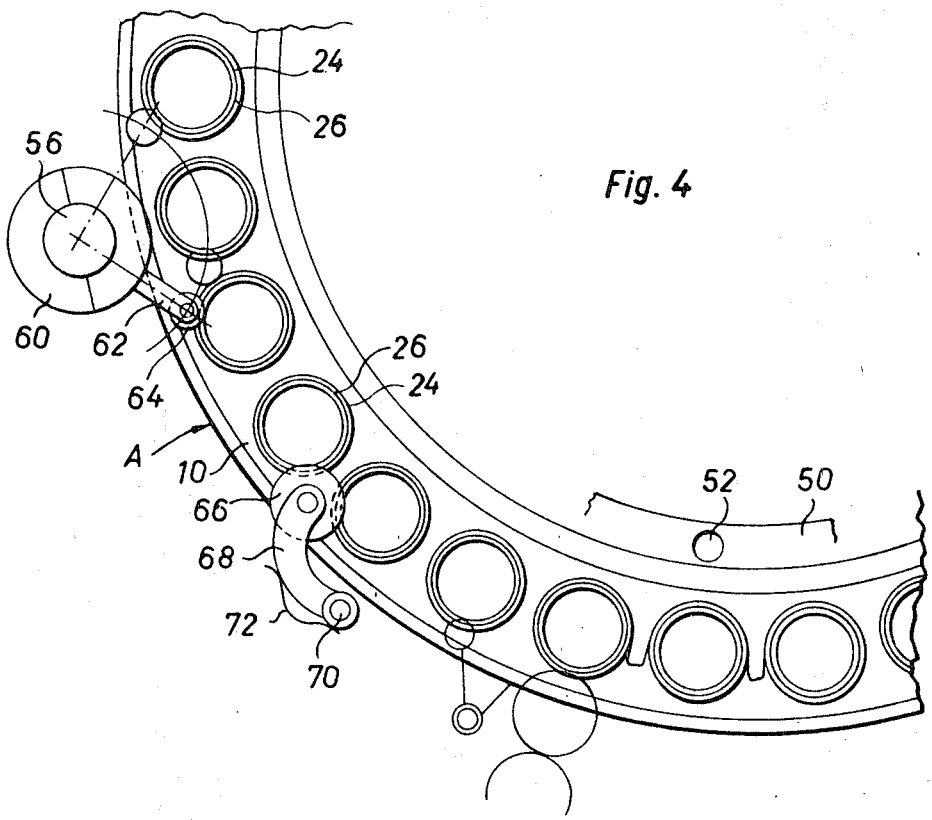
FIG. 4 is a fragmentary plan view of the rotatable table means.

By referring now to the more detailed illustration of the apparatus which is depicted in FIGS. 2 to 4, it will be recognized that the rotatable table means or turret A is preferably composed of two plate members 10 and 12 which are fixedly interconnected by means of spacer elements 14 as well as the pivot pin or shaft 16 and sleeve member 15. The pivot pin or shaft 16 is guided in a bearing arrangement 18. This bearing arrangement 18 is mounted at the base plate 20 of the frame unit B (FIG. 3).

The plate members 10 and 12 exhibit aligned bores $10a$ and $12a$ respectively, at their outer or external marginal region. In each bore $10a$ of the plate member 10 there is inserted a sleeve member 22 which is retained by a threaded socket 24 or equivalent expedient. As best seen by referring to FIG. 3, this sleeve member 22 transforms at its lower region into a cylindrical portion 26. Within this sleeve member 22 there is provided a slide incorporating a tubular member 28 which is formed at its upper end as a cup member 30. In each of these cup members 30 there is inserted a container K or the like which is to be filled. Internally of the sleeve or tube member 28 there is adjustably arranged a counter-sleeve 32 which is held by means of a screw 34 or the like at the floor $30a$ of the cup member 30. This screw 34 is encircled by a helical or spiral spring 35 which, on the one hand, bears against the floor $30a$ and, on the other hand, against a shoulder $32a$ of the counter-sleeve 32. At the lower slotted or bifurcated end of the counter-sleeve 32 there is arranged a roller 36 which is operably associated with the profile of a, for instance, ring-shaped control surface $40a$ of a control cam means 40 provided at the base plate 20 (FIG. 2). As a result, and in accordance with the design of the control surface $40a$ of the control cam means 40, the container K seated in each cup member 30 will be raised or lowered during revolving of the rotatable table means A.

Further, it will be recognized that flange members 42 are provided at the bores $12a$ arranged at the periphery of the plate member 12. These flange members 42 are profiled or shaped such as to be able to receive the mouth portion $K_1$ of the containers K placed in the guide cup members 30 situated therebelow. For this purpose, each flange member 42 exhibits a recessed portion 44 at its lower inlet opening and which terminates at an annular shoulder 45. The container K bears with its upper open edge or mouth $K_1$ against this annular shoulder 45 under the action of the spring member 35 when the roller 36 has raised the cup member 30 in accordance with the control sequence of the ring-shaped control surface $40a$ of the control cam means 40.

As more closely apparent by inspecting FIG. 3, the introduction or delivery of the containers K takes place through the agency of an inclined plane $C_1$ which is a component or part of the loading or charging station C. This inclined plane $C_1$ terminates at the edge of the container receiving-cup member 30 between the plate members 10 and 12, so that the container K at the end of this inclined plane $C_1$ falls, owing to its own weight, onto the floor $30a$ of the cup member 30. In this regard, the container K at the end of the inclined plane $C_1$ and in the cup member 30 is vertically erected by means of one or more tong-shaped clamp members 50. These clamp member 50 are fixedly arranged by means of screws 52 at the plate member 10.

The transport or displacement of the rotatable table means A takes place through the agency of an indexing or stepwise drive arrangement encompassing a driven shaft 56 seated at the base plate 20 and which is kinematically coupled with a non-illustrated prime mover or drive. As best ascertained by referring to FIG. 2, a plate or disc member $60a$ is keyed onto the shaft 56 and is provided with a face or frontal cam 60. This plate $60a$ possesses a radial arm 62 arranged in a suitable angular position and provided at its end with a roller 64.

As best ascertained by inspecting FIG. 4, the roller 64 engages at the sleeve member 26 and brings about a stepwise displacement of the rotatable table means or turret A during rotation of the driven shaft 56. This stepwise transport is amplified in that a roller 66 arranged at the end of an arm 68 engages in the spaces between neighboring sleeve members 26, which exactly defines the angular position of the rotatable table means A. In this regard, the arm 68 is mounted at location 70 at the base plate 20 and is subjected to the action of a spring member 72.

A roller 74 is disposed in operable association with the face cam 60. Roller 74 is mounted at the end of a slide 76 which is equipped with rollers or runners 78. The latter cooperate with vertical guide means 80 provided at a carrier or support 82 mounted at the base plate 20 of the frame unit B. This carrier or support 82 is located at an angular position with respect to the rotary table or turret A, and specifically is disposed at the stripping station or location G at the outlet side or end of the cooling compartment F.

A ledge member 84 having a pin member 85 is provided at the upper end of the slide 76. This pin member 85 engages in a bore $82a$ formed at the carrier or support 82 in order to impart to the slide 76 a further guiding action. In the direction of the free end of the ledge member 84 there is provided a small sleeve 86 through which there is guided the shaft 88 of a suitable drive member, which to preserve clarity in illustration has been conveniently omitted. This small shaft 88 supports a scraper in the form of a knife or cutter means 90 which engages in a recess formed by the annular shoulders 46 and 48 above the opening of the flange 42. The shaft 88 drives the cutter means 90 so that the latter revolves and preferably oscillates back and forth in a circular motion. The aforementioned small sleeve 86 is provided with a cover or hood 92 in which there is accommodated or housed the upper portion of the cutter means 90, so that its lower portion can be pushed into the upper opening of the flange 42. If desired, it is possible to connect the cover or hood 92 with the small sleeve 86 in such a manner that it is axially displaceable against the action of non-illustrated spring means and impacts the cutter means 90. In such case, the edge of the cover 92 can protrude somewhat past the lower end of the cutter means 90 in order to come into operable association with the edge of the opening at the flange 42, and thereby to facilitate pushing in of the cutter means 90 into this opening during the displacement of the slide 76.

Externally of the sleeve 86 the ledge member 84 is provided with a screw 94 having a rotary knob $94a$, with the tip $94b$ of such screw 94 being able to come into operable contact or association with the plate member 12. This screw 94 enables controlling the stroke of the slide 76 and thereby the terminal position of the lower end of the cutter means 90.

Figure 5:
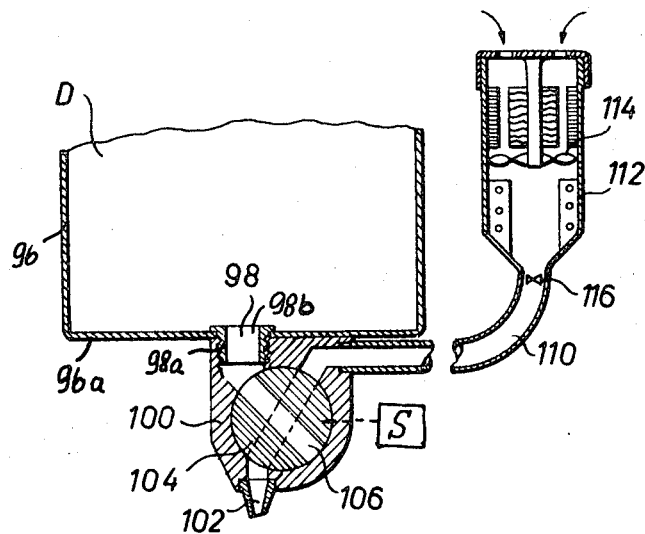
FIG. 5 is a fragmentary sectional view of the dosing means or mechanism of the apparatus.

The dosing means or mechanism D depicted in FIG. 5 incorporates a supply receptacle or container 96 for the medium or material to be filled. This receptacle or container 96 can be equipped with a suitable non-illustrated heating mechanism in order to maintain the medium in a flowable or fluent condition. At the floor $96a$ of the supply receptacle 96 there is mounted a small sleeve 98 provided with threading $98a$. This small sleeve 98 carries a hollow pouring head 100 which is provided at a suitable location with a distributor nozzle 102.

Within the distributor or pouring head 100 there is sealingly arranged a pivotable pin member 104 which at the position of its diameter is provided with a diametrically extending recess or bore 106, the volume of which is greater than the volumetric capacity of the container K which is to be filled. This pin member 104 is laterally connected with a schematically illustrated control means S which actuates the dosing means D in synchronism with the stepwise rotation of the rotary table means A. The control means S enables controlling of the dispensing and shut-off of the material which is being dosed into the containers K in direct correlation to the stepwise rotation of the rotary table means A.

The distributor or pouring head 100, in addition to the nozzle 102, further possesses a conduit 110 which leads to a pressurized air generator or compressor 112 equipped with a ventilator or blower 114. If desired, this pressurized air generator 112 can be provided wtih heating elements in order to heat up the air blown into the conduit 110. It will also be recognized that a valve 116 is located in conduit 110 and by means of which it is possible to regulate the air current.

Now, if the bore or recess 106 of the pin member or valve spool 104 communicates with the opening 98b of the threaded sleeve 98, then this bore 106 can fill up with medium coming from the supply receptacle or container 96. Upon subsequently turning the valve spool 104 the bore 106 then communicates with the nozzle 102 and the conduit 110, whereupon the air current within the conduit 110 presses the medium through the nozzle 102.

The previously described apparatus operates in the following manner: The empty containers K arrive from a non-illustrated collecting receptacle individually via the plane C₁ to a container receiving-cup member 30 which is disposed in the proper receiving position, as such has been previously described. The placing of the container K into the cup member 31 takes place at such time as the rotary table means or turret A is at standstill, whereby a suitable holding or retaining member C₂ in each case releases a container K in synchronism with the rotary movement of the rotatable table means A.

As previously explained, during the stepwise rotation of the rotatable table means A the containers K are successively raised, so that the mouth portion K₁ thereof can be pushed into the conical opening or depression 44 of the flange 42 located thereover.

The edge of this mouth piece or mouth portion K₁ is elastically pressed against the annular shoulder or rim 45 in such a manner that these elements bear tightly against one another. For this purpose, the rim or annular shoulder 45 can also be formed of an elastic material, for instance polyethylene resins. Further displacement of the rotary table means A successively places the containers K at the region of the nozzle 102. During each stepwise pause there is carried out a rotation or pivoting of the pin member or valve spool 104 in such a manner that the medium is displaced out of the bore 106 into the container K, as such has been previously explained. However, as also mentioned, since the volume of the bore 106 exceeds the volumetric capacity of the container K, a portion of the medium will collect in the opening of the flange 42 and in the compartment formed by the projections or shoulders 46, 48 neighboring such flange 42 after the container K has been completely filled. This feature effectively prevents the formation of air bubbles.

The next step places the filled containers K in the cooling chamber or compartment F for quick hardening of the material or medium. If desired, it is further possible to have the container K previously pass through a shaking device.

Upon leaving the cooling chamber or compartment F the container K arrives at a cleaning or scraping apparatus G where the flange 42 comes into operable association with the hood member 92. The slide 80 is lowered owing to its own weight and spring pressure, so that the cutter means 90, while maintaining its rotation, is pushed into the opening of the flange 42. This cutter means 90 then removes the hardened excess material up to the rim 45 at the flange 42. Since the thickness of this rim 45 is quite small scraping of the substance takes place almost up to the edge of the mouth piece or mouth K₁ of the relevant container K. If desired, such scraping action can also take place up to the edge itself or even somewhat below, in that the lower end of the cutter means 90 is appropriately formed so that the latter can penetrate into the bore of the rim 45 or also into the mouth portion K₁.

The further indexing sequence of the rotatable table means A conducts the containers K to the ejection station H. During this last-mentioned displacement the roller 36 of the slide 32 follows the descending portion of the annular or ring-shaped control surface 40a of the control cam means 40. As a result, the cup member 30 descends and removes the mouth portion K₁ of the container K away from the flange 42, whereupon the filled container K can be removed from the guide cup member 30 and conducted to a suitable non-illustrated collecting receptacle.

Figure 6:
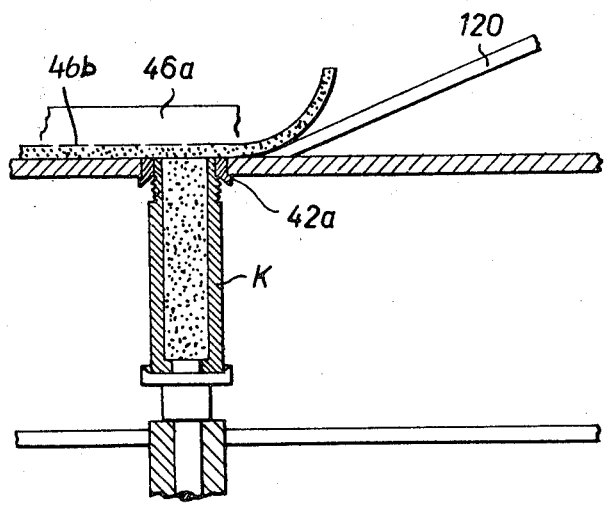
FIG. 6 is a fragmentary view of a modified form of rotatable table means or turret.

In the variant form of embodiment depicted in FIG. 6, instead of providing a recess above each flange 42 which is formed by the raised portions of shoulders 46 and 48, there is here provided for the flange or socket 42a an annular groove with slotted or perforated floor, as generally indicated by reference numerals 46b, and which is bounded by the raised portion 46a. In this case, at the outlet side of the cooling compartment F, there is provided at the cleaning station G, instead of the previously considered cutter, a stripper 120 in the form of a knife, the blade edge of which engages with the floor of the recess in order to scrape away the material which collects at this location.

The described apparatus can, of course, be appropriately modified. For instance, the cup members 30 and the flanges 42 could be exchangeable in order to accommodate different sizes of containers K. Likewise, it is possible to replace the spacers 14 between the plate members 10 and 12, depending upon the size of these containers.

While there is shown and described present preferred embodiments of the invention it is to be distinctly understood that the invention is not limited thereto but may be otherwise variously embodied and practiced within the scope of the following claims.

What is claimed is:

1. Apparatus for the automatic dosing and filling of containers with a fluent material capable of solidifying at ambient temperatures, said apparatus comprising:
rotatable table means including top and bottom plate members spaced apart from one another, said bottom plate member being provided at the region of its periphery with a plurality of container-guide cup members for the receipt and guiding of the containers to be filled, said top plate member being provided with flange means disposed above said container-guide cup members and adapted to receive the mouths of said containers; actuating means disposed below said bottom plate member for raising and lowering said container-guide cup members and the containers therein periodically during the rotation of said table means, whereby the mouths of said containers are pressed against said flange means when said containers are raised;
means providing an overflow recess above each said flang means of said rotatable table means;
infeed station means disposed at the periphery of said rotatable table means for loading said container-guide cup members of said rotatable table means with empty containers;
dosing means disposed at the periphery of said rotatable table means after said infeed station means in the direction of table rotation for introducing a dosed quantity of fluent material into the mouths of said containers, said dosed quantity exceeding the capacity of each said container;

cooling means disposed at the periphery of said rotatable table means after said dosing means in the direction of table rotation for cooling and solidifying the fluent material in said containers;

stripper means disposed at the periphery of said rotatable means after said cooling means in the direction of table rotation for removing the excess quantity of material from the mouth of said containers; and means disposed at the periphery of said rotatable table means after said stripper means in the direction of table rotation for permitting removal of said containers from said rotatable means.

2. Apparatus as defined in claim 1, further including drive means for stepwise indexing of said rotatable table means, and a shut-off means provided for said dosing means actuated in response to the revolving motion of said rotatable table means.

3. Apparatus as defined in claim 2, wherein said rotatable table means revolves about an axis of rotation, said actuating means comprising a control cam means having a control surface, said control cam means being constructed substantially in the form of a ring and arranged coaxially with regard to said axis of rotation of said rotatable table means, said plurality of container-guide cup members being operably associated with said control surface of said control cam means such that said guide cup members can be selectively raised or lowered.

4. Apparatus as defined in claim 3, further including sleeve means for said bottom plate member provided at the region of its periphery with said container-guide cup members by means of which the latter are slidably retained.

5. Apparatus as defined in claim 4, wherein said sleeve means for each container-guide cup member comprises a sleeve member provided at the floor of each cup member, an adjustable counter-sleeve slidably arranged within said sleeve member, a roller provided for said adjustable counter-sleeve which is operably associated with said control surface of said control cam means.

6. Apparatus as defined in claim 5, further including spring means for loading said container-guide cup members.

7. Apparatus as defined in claim 6, and said drive means including a shaft disposed parallel to said axis of rotation of said rotatable table means, at least one arm member seated radially at said shaft, said arm member engaging in the intermediate space between two neighboring sleeve members for the stepwise angular adjustment of said rotatable table means, and centering means cooperating with said sleeve members.

8. Apparatus as defined in claim 7, further including tong-shaped members arranged between both of said plate members for supporting and vertically aligning the container seated upon its associated container-guide cup member.

9. Apparatus as defined in claim 1, wherein said stripper means comprises knife means which can revolve in opposite directions about an axis of rotation.

10. Apparatus as defined in claim 9, wherein said means providing said overflow recess defines an annular groove.

11. Apparatus as defined in claim 1, wherein said dosing means comprises a supply container for the fluent material having an outlet opening, said nozzle being arranged in the region of said outlet opening, means providing a dosing compartment disposed between said outlet and said nozzle, blower means provided for said dosing compartment, said dosing compartment-providing means being pivotable in dependency upon the indexing motion of said rotatable table means from a filling position into an emptying position, in the latter position of which said dosing compartment communicates with said blower means for expelling the material to be filled through said nozzle into a container.

12. Apparatus for the automatic dosing and filling of containers with fluent material comprising a rotatable table means provided at its periphery with recesses for the reception of containers which are to be filled, drive means for stepwise indexing said rotatable table means, dosing means incorporating at least one nozzle for introducing a dosed quantity of fluent material into said containers, shut-off means provided for said dosing means actuated in response to the revolving motion of said rotatable table means, and means for removing the filled containers from said rotatable table means and for delivering such containers for further processing; wherein said rotatable table means revolves about an axis of rotation, a control cam means having a control surface, said control cam means being constructed substantially in the form of a ring and arranged coaxially with regard to said axis of rotation of said rotatable table means, a base plate carrying both said rotatable table means and said control cam means, a plurality of adjustable container-guide cup members for receiving the containers to be filled, said container-guide cup members being operably associated with said control surface of said control cam means such that said guide cup members can be raised and lowered, flange means arranged at said rotatable table means for receiving the mouth portion of the associated container when the latter is raised; wherein said rotatable table means comprises two plate members spaced from one another, a pivot pin upon which both of said plate members are rotatably mounted, one of said plate members being provided at the region of its periphery with a number of said container-guide cup members for the receipt and guiding of the containers to be filled, the other of said plate members being provided with said flange means against which bear the respective mouth portion of said containers during the filling operation; wherein said control surface of said control cam means cooperates with said container-guide cup members in order to press the respective mouth portion of said containers in a direction toward said flange means; a sleeve means for said container-guide cup which comprises a sleeve member provided at the floor of each cup member, an adjustable counter-sleeve slidably arranged within said sleeve member, a roller provided for said adjustable counter-sleeve which is operably associated with said control surface of said control cam means; wherein said container-guide cup members further include spring means for loading of the same; said drive means including a shaft disposed parallel to said axis of rotation of said rotatable table means, at least one arm member seated radially at said shaft, said arm member engaging in the intermediate space between two neighboring sleeve members for the stepwise angular adjustment of said rotatable table means, and centering means cooperating with said sleeve members; said apparatus further including tong-shaped members arranged between both of said plate members for supporting and vertically aligning the containers seated upon its associated container-guide cup member; and said apparatus further including means providing an overflow recess above each container receiving recess of said rotatable table means.

13. Apparatus as defined in claim 12, further including cooling means disposed along the periphery of said rotatable table means between said dosing means and said removing means and a stripper means arranged at the output side of said cooling means for removing the material which has overflown past the mouth portion of each container.

14. Apparatus as defined in claim 13, wherein said stripper means comprises knife means which can revolve in opposite direction about an axis of rotation.

15. Apparatus as defined in claim 13, wherein said means providing said overflow recess defines an annular groove.

References Cited

UNITED STATES PATENTS

| | | | |
|---|---|---|---|
| 2,091,263 | 8/1937 | Ball | 141—82 X |
| 2,769,464 | 11/1956 | Cox | 141—150 X |
| 2,901,149 | 8/1959 | Richter | 222—194 X |
| 3,064,591 | 11/1962 | Van Zandt | 53—123 X |
| 3,124,172 | 3/1964 | Paxson | 141—130 |
| 3,192,968 | 7/1965 | Baruch et al. | 141—130 X |

FOREIGN PATENTS

| | | |
|---|---|---|
| 627,564 | 6/1927 | France. |
| 644,716 | 10/1950 | Great Britain. |
| 1,118,045 | 3/1956 | France. |

LAVERNE D. GEIGER, Primary Examiner

E. J. EARLS, Assistant Examiner

U.S. Cl. X.R.

25—104; 53—123, 127